UNITED STATES PATENT OFFICE 2,577,161

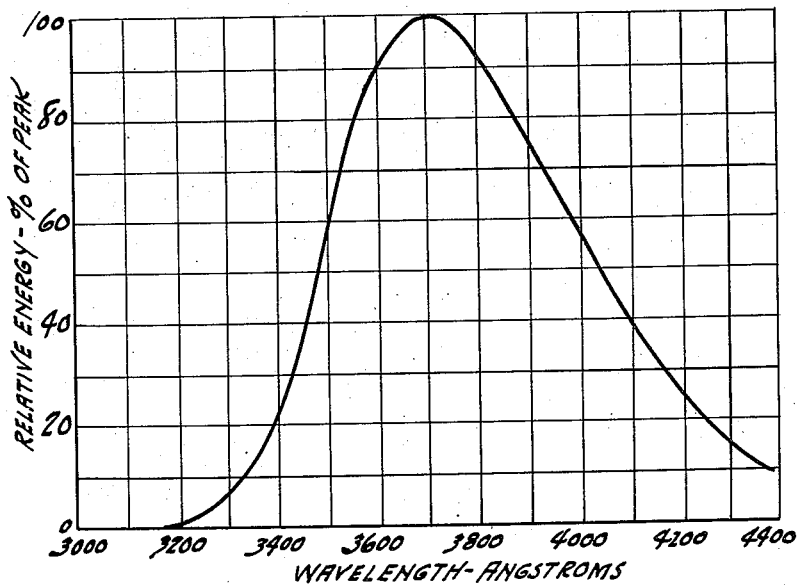

CERIUM ACTIVATED CALCIUM-MAGNESIUM SILICATES

Arthur L. J. Smith, Lancaster, Pa., assignor to Radio Corporation of America, a corporation of Delaware Application July 29, 1949, Serial No. 107,615

11 Claims. (Cl. 252—301.4)

This invention relates to improvements in luminescent materials, also known as phosphors, and to improved methods of preparing these materials.

The improved materials of the present invention are adapted to be excited either by ultra-violet radiations or by cathode rays and some of the materials are characterized by relatively high efficiencies and relatively short periods of decay.

In general, the improved phosphors of the present invention may be prepared by ball milling stoichiometric quantities of materials which decompose to form oxides of calcium, magnesium (and, in some cases, zinc), and silicon, together with an amount of a cerium salt as an activator. The mixture is then fired, cooled, and broken up into a desired particle size. The material which results from this process is a cerium-activated calcium-magnesium silicate, having a basic general formula which may be represented as $n(CaO).MgO.2SiO_2:xCe$, where $n$ may have any value from 1 to 3, inclusive, where $x$ may have any value from about 0.005 to about 0.2, and where the cerium is in the trivalent state. The materials may be further described as being definite crystalline compounds and, where $n$ is 2, zinc may be either partially or completely substituted for the magnesium. It is also possible to have any one of the various calcium silicates or magnesium silicates present in amounts greater than those indicated by the basic formulas, when the excess is present in an amount which will remain in solid solution in the complex silicates and it is further possible to have silica present in excess, when that excess is in solid solution.

It has been known heretofore that various calcium-magnesium silicate minerals occur naturally. All minerals possible in the ternary system, $CaO.MgO.SiO_2$, have also been prepared artificially by C. Burton Clark (J. Am. Cer. Soc. 29, No. 1, 25 (1946)). Clark's object, however, was not to prepare luminescent materials and he did not investigate the use of activators which are necessary to impart luminescent properties to the minerals.

One object of the present invention is to provide improved phosphors having relatively short decay periods.

Another object of the invention is to provide improved phosphors having both relatively short decay periods and relatively high efficiencies.

Another object of the invention is to provide improved phosphors having high peak emission in the ultra-violet and blue regions of the spectrum.

Another object of the invention is to provide improved phosphors which are adapted to be used in the luminescent screen of a cathode ray tube.

Another object of the invention is to provide improved phosphors which can be used to make improved cathode ray tube screens which are relatively low in graininess.

Another object of the present invention is to provide improved phosphors in which the luminescence output is linearly dependent upon current density when the phosphor is excited by cathode rays.

Still another object of the present invention is to provide improved methods of preparing complex silicate phosphors.

These and other objects will be more apparent and the invention will be more readily understood from the following description, including the drawing, which is a graph showing a curve of spectral energy distribution of luminescence output under cathode ray excitation for a phosphor material of the present invention, the phosphor having the molecular formula $$2CaO.MgO.2SiO_2:Ce$$

In general, the improved phosphors of the present invention may be prepared by, first, weighing out amounts of carefully purified calcium and magnesium compounds which will decompose when heated to form the corresponding oxides, then mixing the decomposable compounds of calcium and magnesium with silicic acid or some other compound which will decompose to form $SiO_2$, and a salt of cerium, all of the ingredients being present in amounts such that a desired molar ratio is obtained. The ingredients are ball milled together in liquid suspension for at least 8 hours, and preferably longer, as, for example, 24 hours. The suspension is then removed from the ball mill and evaporated to dryness. The loose cake, thus formed, is broken, mixed, and then placed in combustion boats, which may be of silica glass.

The mixture which is in the combustion boats is then fired in either of two ways, depending upon the valence state of the cerium salt which was used. Where the cerium salt is in the trivalent state, as, for example, cerous chloride ($CeCl_3$), firing may take place in a neutral atmosphere. This atmosphere may be nitrogen, which has been freed of substantially all oxygen. Any other neutral atmosphere may also be used, such as helium or argon. When it is found more convenient to use a ceric compound, as, for example, ceric oxide, the material is fired in a reducing atmosphere. The reducing atmosphere is preferably a hydrogen-steam atmosphere. The steam may be generated by allowing the water to drip slowly from a separatory funnel into the hot combustion tube. As each droplet of water reaches the heated portion of the combustion tube, it is rapidly vaporized. Although the silica glass is slowly crystallized by steam, the deterioration of the combustion tube is sufficiently slow to permit the firing operation to be carried to completion. Instead of a hydrogen-steam reducing atmosphere, carbon monoxide or other reducing gases may also be used. The range of firing temperature which is used is dependent upon several factors. The temperature must be at least high enough to cause the decomposable compounds to decompose to their oxides and react to form the complex silicates. On the other hand, the temperature must be lower than that which will cause the ingredients to melt and fuse together since, if the melting point is exceeded, the luminescent properties of the materials will be lost. In all cases, except that in which zinc is wholly or substantially wholly substituted for magnesium, the firing temperature should be at least 1100° C., but must not exceed 1400° C., since the ingredients fuse above 1400° C. As a practical matter, the temperature is usually maintained below about 1340° C. In order to have complete reaction, firing time should be at least 2 hours. Firing times of from 2 to 3 hours are preferred. Firing may occur in two equal intervals and the material may be ground by mortar and pestel or may be ball milled between firings. Firing times greatly exceeding 3 hours do not cause deterioration of the product but are simply a waste of time and heat energy.

After the firing period is completed, the material is cooled in either a neutral or a reducing atmosphere. As in the case of firing the materials, it is necessary that the atmosphere be non-oxidizing. The neutral cooling atmosphere may be nitrogen or one of the inert gases. After cooling, the reaction product may be ball milled in acetone or some other anhydrous medium to reduce particle size. Ball milling in water may be used, but less desirably, since a rise in pH occurs with some of the materials when water is used during the ball milling operation.

*Example*

Suitably purified calcium carbonate, magnesium carbonate, silicic acid, and cerous chloride are mixed in amounts to give a molar ratio of $2CaO.MgO.2SiO_2:.05Ce$. These are ball milled in a water suspension for 24 hours; the suspension is evaporated to dryness; the loose cake is broken up, mixed in a mortar and pestle and placed in a silica-glass combustion boat. The mixture is fired in a combustion boat in an oxygen-free nitrogen atmosphere for 2 hours at 1220° C. The reaction product is cooled in an oxygen-free nitrogen atmosphere. This material will have an emission curve as shown in the drawing when the phosphor is excited by cathode rays. Peak emission is at about 3700Å., which is in the ultra-violet region of the spectrum.

For all of the phosphors of the present invention, except those in which zinc is wholly substituted for magnesium, the preferred range of firing temperature is 1220°–1300° C. and the preferred firing time is 2 to 3 hours.

When mixtures of calcium oxide, magnesium oxide, and silica are fired, 14 products are possible, the eventual product being dependent upon many factors, the most important of which are the ratios of ingredients, firing temperature and firing time. There is a limited solubility of these products, each in the other. Only 4 silicates containing calcium oxide, magnesium oxide, and silica are known to exist. These are (1) $CaO.MgO.SiO_2$ (2) $CaO.MgO.2SiO_2$ (3) $2CaO.MgO.2SiO_2$ (4) $3CaO.MgO.2SiO_2$. There are also known 6 calcium silicates and 4 magnesium silicates. Out of the 4 calcium magnesium silicates, only 3 were found to be luminescent when activated with cerium. These were numbers 2, 3 and 4, listed above. Each of these 3 luminescent complex silicates has different properties. No. 2 ($CaO.MgO.2SiO_2:Ce$) has the highest efficiency but a somewhat longer decay period than either numbers 3 or 4. No. 3 ($2CaO.MgO.2SiO_2:Ce$) has a shorter decay period than No. 2 and also has good efficiency although its efficiency is not as high as that of No. 2. No. 4 ($3CaO.MgO.2SiO_2:Ce$) has about the same decay period as No. 3 but has an efficiency somewhat lower than that of either No. 2 or No. 3.

In addition to the three basic complex calcium-magnesium silicates, with cerium activator, it is possible, within the scope of the present invention, to prepare several closely related modifications which exhibit desirable luminescent characteristics. For example, it is possible to prepare phosphors in which any one or two of the three luminescent, cerium-activated, basic complex silicates mentioned above may be present in solid solution in another one of this group of three. In this type, the molecular formula may be represented as $nCaO.MgO.2SiO_2:xCe$, and, in this case, $n$ may have any value from 1 to 3, while $x$ may have the same values as in the other materials of the present invention. As an example of this type, one may prepare a material having the formula

which can be shown to be a mixture of

and

Another modification which may be prepared in accordance with the present invention is one in which an excess of silica is present in solid solution in the remaining constituents. For example, a material may be prepared having the general basic formula, $CaO.MgO.mSiO_2:xCe$, where $m$ has a value of between 2 and 2.2, since, in this type, the excess of silica should not exceed 0.2 mol part, in the above molar ratio.

Still another modification of phosphor which may be prepared in accordance with the present invention is one in which the basic complex silicate may contain a quantity of one of the simple silicates of calcium or magnesium in solid solution. As an example, $MgSiO_3$ may be combined in any proportion with

since a complete set of solid solutions is possible.

As previously mentioned, still another modification of materials which may be prepared in accordance with the present invention is that in which ZnO may be substituted for all or part of the MgO in the material 2CaO.MgO.2SiO$_2$:xCe. As an example of this type, one may prepare a material having the molecular formula 2CaO.0.5MgO.0.5ZnO.2SiO$_2$:xCe This type of phosphor has a desirably short decay period, also, and its efficiency is sufficiently high for practical use. The completely substituted form; i. e., 2CaO.ZnO.2SiO$_2$:xCe has the shortest persistence of any of the phosphors of the present invention. Efficiency is not as high as in some of the other forms but, where efficiency may be sacrificed for very short decay period, this form is preferred. In the forms in which ZnO is substituted either wholly or partially for MgO, it is desirable to use the steam-hydrogen reducing method in preparing the phosphor since steam re-oxidizes any zinc which may be temporarily reduced by the hydrogen during the firing process. Also, in the case of the wholly substituted ZnO form, the firing temperature should be between about 900° and about 1100° C. since fusion occurs above 1100° C.

The cerium concentration (the value of $x$ in the formulas given) may vary from 0.005 to 0.2 mol per mol of calcium-magnesium silicate. The best and most consistent results have been obtained using 0.05 mol of cerium per mol of calcium-magnesium silicate, introduced either as chloride or nitrate. It is necessary that at least part of the cerium be in the trivalent form in order for the material to be luminescent. Cerium, in the tetravalent state, has been added after the firing step was complete, with almost no effect being observed in the product. From this and other factors, it has been established that the presence of some tetravalent cerium does no harm to the product but, also, does not serve as an activator.

The preferred form of the phosphor of the present invention (2CaO.MgO.2SiO$_2$:Ce) has an overall efficiency as much as 7 to 10 times that of the best zinc oxide phosphors when the output is measured at 8 kv. and 0.5 ua., using a defocused spot. The useful output of luminescence of this form falls to a "zero" level in about $5 \times 10^{-7}$ seconds compared to about $5 \times 10^{-8}$ seconds for the best zinc oxide phosphors.

There have thus been provided improved phosphors, the preferred forms of which have relatively high luminescence efficiencies, especially in the ultra-violet region, under excitation by cathode rays. The improved phosphors also have the further desirable characteristic of relatively short decay times, which makes them of particular value in kinescope tubes, which are adapted to furnish a flying spot which is impinged on a photosensitive surface.

For purposes of comparing the several different luminescent, cerium-activated, complex calcium-magnesium silicates and the calcium-zinc silicate with respect to their relative efficiency and relative persistence, data are provided in the following table.

Table I

| Compound | Relative Efficiency | Relative Persistence |
|---|---|---|
| CaO.MgO.2SiO$_2$:Ce | 155 | 75 |
| 2CaO.MgO.2SiO$_2$:Ce | 120 | 2 |
| 3CaO.MgO.2SiO$_2$:Ce | 105 | 3 |
| 2CaO.ZnO.2SiO$_2$:Ce | 50 | 1 |

The lower numerical values of persistence are those corresponding to shorter decay periods in seconds.

It can also be shown that the improved phosphors of the present invention have the additional desirable property of providing materials which can be used to make improved cathode ray tube screens having less graininess than those made, for example, from zinc oxide phosphors and that the phosphors of the present invention also exhibit linear increase in luminescence output with increase in current density of the exciting cathode rays.

I claim as my invention:

1. A crystalline luminescent material having the general formula $n$(CaO).MgO.2SiO$_2$:xCe where $n$ has a value from 1 to 3, inclusive, where the cerium activator is in the trivalent state, and where $x$ has a value of from about 0.005 to about 0.2.

2. A crystalline luminescent material having the general formula

2CaO.AO.2SiO$_2$:xCe where A is at least one of the class consisting of zinc and magnesium, where the cerium activator is in the trivalent state, and $x$ has a value of about 0.005 to about 0.2.

3. A crystalline luminescent material having the formula

3CaO.MgO.2SiO$_2$:xCe the cerium activator being in the trivalent state, and with $x$ having a value of about 0.005 to about 0.2.

4. A crystalline luminescent material having the formula

CaO.MgO.$m$SiO$_2$:xCe the cerium activator being in the trivalent state, where $m$ has a value of 2 to about 2.2, and $x$ has a value of about 0.005 to about 0.2.

5. A crystalline luminescent material having the formula

CaO.MgO.2SiO$_2$:xCe said cerium activator being in the trivalent state and $x$ having a value of about 0.005 to 0.2.

6. A method of preparing a cerium activated complex silicate phosphor comprising thoroughly mixing together, in desired stoichiometric proportions, compounds which may be thermally decomposed to form calcium oxide and a second oxide which is at least one oxide from the class consisting of zinc and magnesium oxides, together with a compound which will decompose to form silicon dioxide, and a salt of cerium, firing the mixture for at least 2 hours in a non-oxidizing atmosphere at a temperature above that which is sufficient to cause the materials to react to form a complex silicate but below the temperature at which the materials melt, and then cooling the reaction product thus formed in a non-oxidizing atmosphere.

7. A method according to claim 6 in which said cerium salt is a ceric salt and said firing atmosphere is a reducing atmosphere.

8. A method according to claim 6 in which said cerium salt is a cerous salt and said firing atmosphere is neutral.

9. A method according to claim 6 in which said second oxide is magnesium oxide and said firing temperature is from about 1100° C. to about 1340° C.

10. A method according to claim 6 in which said second oxide is zinc oxide and said firing temperature is from about 900° C. to about 1100° C.

11. A crystalline luminescent material having the basic general formula $$n(CaO).MgO.2SiO_2:xCe$$

where $n$ has a value from 1 to 3, inclusive, where $x$ has a value from 0.005 to 0.2 and where said cerium is present as an activator and is in the trivalent state, said material being further characterized in that one of the simple metallic silicates is present in an amount in excess of that indicated by the basic formula, said excess being in solid solution in the remaining constituents.

ARTHUR L. J. SMITH.

REFERENCES CITED

The following references are of record in the file of this patent:

UNITED STATES PATENTS

| Number | Name | Date |
|---|---|---|
| 2,254,956 | Aschermann | Sept. 2, 1941 |

FOREIGN PATENTS

| Number | Country | Date |
|---|---|---|
| 896,651 | France | Feb. 28, 1945 |